United States Patent
Amend et al.

(10) Patent No.: US 9,359,746 B1
(45) Date of Patent: Jun. 7, 2016

(54) OVER AND UNDER COMBINED SEWER OVERFLOW/STORMWATER CONVEYANCE CHAMBERS

(71) Applicant: ARCADIS U.S., Inc., Highlands Ranch, CO (US)

(72) Inventors: John R. Amend, East Aurora, NY (US); Jeremy G. Kleyman, New York, NY (US); Tanya McCoy-Caretti, Ebensberg, PA (US); John D. Ross, Beaver Falls, PA (US)

(73) Assignee: ARCADIS U.S., Inc., Highlands Ranch, CO (US)

( * ) Notice: Subject to any disclaimer, the term of this patent is extended or adjusted under 35 U.S.C. 154(b) by 44 days.

(21) Appl. No.: 14/244,666

(22) Filed: Apr. 3, 2014

Related U.S. Application Data (63) Continuation of application No. 61/807,852, filed on Apr. 3, 2013.

(51) Int. Cl.
*E02B 13/00* (2006.01)
*E03B 1/02* (2006.01)
*E03F 1/00* (2006.01)
*E03F 5/10* (2006.01)

(52) U.S. Cl.
CPC ... *E03B 1/02* (2013.01); *E03F 1/00* (2013.01); *E03F 5/101* (2013.01); *E03F 5/105* (2013.01)

(58) Field of Classification Search
USPC ............... 405/36, 52, 118, 124; 210/170.03, 210/747.2; 137/236.1
See application file for complete search history.

(56) References Cited

U.S. PATENT DOCUMENTS

| | | | | |
|---|---|---|---|---|
| 6,102,618 | A * | 8/2000 | Takada et al. | 405/52 |
| 6,503,404 | B2 * | 1/2003 | Ghalib | 210/749 |

\* cited by examiner

*Primary Examiner* — Sean Andrish
(74) *Attorney, Agent, or Firm* — Nancy J. Flint, Esq.; Nancy J. Flint, Attorney At Law, P.A.

(57) ABSTRACT

A tunnel design used to convey combined or sanitary sewage during wet weather events is disclosed. The design comprises an over chamber and an under chamber in releasable coordination with each other. The over chamber comprises an open canal and the under chamber comprises a box culvert.

9 Claims, 14 Drawing Sheets

OVER AND UNDER COMBINED SEWER OVERFLOW/STORMWATER CONVEYANCE CHAMBERS

RELATED APPLICATIONS

This application is a non-provisional of U.S. Provisional Application No. 61/807,852 filed Apr. 3, 2013, the disclosure of which is incorporated herein in its entirety by reference.

FIELD OF THE INVENTION

The invention relates to an alternative engineering design to the traditional tunnel design used to convey combined or sanitary sewage during wet weather events. The new design comprises an over chamber and an under chamber in releasable coordination with each other. The over chamber may comprise an open canal and the under chamber may comprise a box culvert. The design of the invention reduces overall construction costs while simultaneously providing community benefits associated with green infrastructure and enhanced economic development and higher property values around and directly attributable to the new design.

BACKGROUND OF THE INVENTION

The nation has considerable resources invested in drinking water and sewer services. Although local governments are major investors in this sector, other capital intensive services (i.e., transportation, communication, and electricity) compete for limited local resources. Beyond providing safe drinking water and environmental protection, water and sewer investments also contribute to economic growth in the local and national economies.

Since 1970, total public investment in wastewater infrastructure and operating and maintenance expenses (O&M) exceeded $658.4 billion. According to ASCE, water and wastewater systems are the second largest public works infrastructure in the country. Infrastructure investment contributes to economic growth by expanding the productive capacity of a locality, region, state, or the nation as a whole. Public infrastructure investment yields positive returns, and investment in water and sewer infrastructure has greater returns than most other types of public infrastructure.

Local governments are the primary investors in water and sewer systems. Beyond investments in physical plant and equipment, spending on the operations and maintenance of water systems also is a major financial obligation for states and local governments. In 2004, spending by states and localities on water and sewer operations and maintenance was $51.2 billion, second only to highway and roads.

Stormwater.

Municipal water systems must address two different sources of urban drainage: stormwater and sewage. Stormwater is rainwater and melted snow that runs off streets, lawns, and other sites. When stormwater is absorbed into the ground, it is filtered and ultimately replenishes aquifers or flows into streams and rivers. In developed areas, however, impervious surfaces such as pavement and roofs prevent precipitation from naturally soaking into the ground. Traditional stormwater management design focuses on collecting stormwater in piped networks and transporting it off site as quickly as possible, either directly to a stream or river, to a large stormwater management facility (basin), or to a combined sewer system flowing to a wastewater treatment plant. Systems to manage stormwater are often called "storm drains" or "storm sewers."

Sewage Systems.

A sewage system conveys wastewater to a publicly-owned treatment works (POTW). Two types of public sewer systems predominate in the United States: combined sewer systems (CSSs) and sanitary sewer systems (SSSs).

Combined Sewer Systems.

CSSs were among the earliest sewer systems constructed in the United States and were built until the first part of the 20th century. A CSS is defined as a wastewater collection system owned by a state of municipality that conveys domestic, commercial, and industrial wastewaters and storm water runoff through a single pipe system to a publicly-owned treatment works (POTW).

Sanitary Sewer Systems.

Eventually, local governments began to separate storm flows from wastewater flows and separate sanitary sewer and storm sewer systems replaced combined sewer systems in many areas. Since the first part of the 20th century, municipalities in the United States have generally constructed SSSs. An SSS is defined as a municipal wastewater collection system that conveys domestic, commercial, and industrial wastewater, and limited amounts of infiltrated groundwater and storm water, to a POTW. SSSs are not designed to collect large amounts of storm water runoff from precipitation events. Areas served by SSSs often have a municipal separate storm sewer system to collect and convey runoff from rainfall and snowmelt.

Design of Sewer Systems.

In the ideal case, a sewer system is completely gravity-powered. Pipes from each house or building flow to a sewer main that runs, for example, down the middle of the street. Typically, the sewer main might be 3 to 5 feet (1 to 1.5 m) in diameter. Periodically, a vertical access chamber (called a manhole) will run up from the main to the surface, where it is covered by a manhole cover. Manholes allow access to the main for maintenance purposes.

The sewer mains flow into progressively larger pipes until they reach the wastewater treatment plant. In order to help gravity do its job, the wastewater treatment plant is usually located in a low-lying area, and sewer mains will often follow creekbeds and streambeds (which flow naturally downhill) to the plant. Normally, gravity cannot do all the work and a sewer system will include a grinder-pump or a lift station to move the wastewater up over a hill.

Once the water reaches the wastewater treatment plant, it goes through one, two or three stages of treatment to allow solids to settle out of the water and for scum to rise; to remove organic materials and nutrients with the help of bacteria; and to remove phosphorous and nitrogen from the water, prior to discharge of the treated water.

Sewer Overflows.

During wet weather events (e.g., rainfall or snowmelt), the combined volume of wastewater and stormwater runoff entering CSSs often exceeds conveyance capacity. Most CSSs are designed to discharge flows that exceed conveyance capacity directly to surface waters, such as rivers, streams, estuaries, and coastal waters. Such events are called combined sewer overflows, or CSOs. A CSO is defined as the discharge from a CSS at a point prior to the POTW treatment plant. Some CSO outfalls discharge infrequently, while others discharge every time it rains. Overflow frequency and duration varies from system to system and from outfall to outfall within a single CSS. Because CSOs contain untreated wastewater and storm water, they contribute microbial pathogens and other pollutants to surface waters. CSOs can impact the environment and human health. Specifically, CSOs can cause or contribute to water quality impairments, beach closures, shellfish bed closures, contamination of drinking water supplies, and other environmental and human health problems.

New York City, Washington D.C., Seattle and other cities with combined sewer systems have this problem due to a large influx of storm water after every heavy rain. Some cities have dealt with this by adding large storage tanks to hold the combined sewer overflow discharge until it can be treated. Chicago and many other cities have a system of tunnels, collectively called the Deep Tunnel, underneath the city for storing its combined sewer overflow discharge.

About 772 communities in the United States have combined sewer systems, serving about 40 million people. CSO discharges during heavy storms can cause serious water pollution problems in these communities. Pollutants from CSO discharges can include bacteria and other pathogens, toxic chemicals, and debris. The U.S. Environmental Protection Agency (EPA) issued a policy in 1994 requiring municipalities to make improvements to reduce or eliminate CSO-related pollution problems. In 2000, Congress amended the Clean Water Act to require the municipalities to comply with the EPA policy.

Untreated or partially treated discharges from SSSs are commonly referred to as sanitary sewer overflows, or SSOs. SSOs have a variety of causes including blockages, line breaks, sewer defects that allow excess storm water and groundwater to overload the system, lapses in sewer system operation and maintenance, inadequate sewer design and construction, power failures, and vandalism. An SSO is defined as an untreated or partially treated sewage release from a SSS.

Generally speaking, SSOs can occur at any point in an SSS, during dry weather or wet weather. SSOs include overflows that reach waters of the United States. SSOs also include overflows out of manholes and onto city streets, sidewalks, and other terrestrial locations. A limited number of municipalities have SSOs that discharge from fixed points within their sewer system. SSSs can back up into buildings, including private residences. When sewage backups are caused by problems in the publicly owned portion of an SSS, they are considered SSOs.

SSOs can range in volume from one gallon to millions of gallons. The microbial pathogens and other pollutants present in SSOs can cause or contribute to water quality impairments, beach closures, shellfish bed closures, contamination of drinking water supplies, and other environmental and human health problems.

Aging sewer line infrastructure in many communities allows rain and snow melt to enter sanitary sewer systems. During significant wet weather events it is possible for influent flows to exceed the treatment capacity of existing secondary treatment units. Known as "peak flows," these wet weather flows are sometimes diverted around secondary treatment units and then either recombined with flows from the secondary treatment units or discharged directly into waterways from the treatment plant in order to prevent any damage to the treatment facility. Operators of wastewater treatment plants must manage these high flows to both ensure the continued operation of the treatment process and to prevent backups and overflows of raw wastewater in basements or on city streets.

SSOs can also damage property and the environment. When basements flood, the damaged area must be thoroughly cleaned and disinfected to reduce the risk of disease. Cleanup can be expensive for homeowners and municipalities. Rugs, curtains, flooring, wallboard panels, and upholstered furniture usually must be replaced.

A key concern with SSOs that enter oceans, bays, estuaries, rivers, lakes, streams, or brackish waters is their effect on water quality. When bodies of water cannot be used for drinking water, fishing, or recreation, society experiences an economic loss. Tourism and waterfront home values may fall. Fishing and shellfish harvesting may be restricted or halted. SSOs can also close beaches. One 1994 study claims that SSOs closed beaches across the nation that year for a total of more than 300 days.

Mitigation of Sewer Overflows.

Municipalities in the United States have been undertaking projects to mitigate CSOs since the 1990s. For example, prior to 1990, the quantity of untreated combined sewage discharged annually to lakes, rivers and streams in southeast Michigan was estimated at more than 30 billion US gallons (110,000,000 m3) per year. In 2005 with nearly $1 billion of a planned $2.4 billion CSO control investment put into operation, untreated discharges have been reduced by more than 20 billion US gallons (76,000,000 m3) per year. This investment that has yielded a 67% reduction in CSO has included numerous sewer separation, CSO storage and treatment facilities, tunnels, and wastewater treatment plant improvements constructed by local and regional governments. Many other areas in the United States are undertaking similar projects.

Many avoidable SSOs are caused by inadequate or negligent operation or maintenance, inadequate system capacity, and improper system design and construction. These SSOs can be reduced or eliminated by:

Sewer system cleaning and maintenance;

Reducing infiltration and inflow through system rehabilitation and repairing broken or leaking service lines;

Enlarging or upgrading sewer, pump station, or sewage treatment plant capacity and/or reliability;

Construction wet weather storage and treatment facilities to treat excess flows; and Communities also should address SSOs during sewer system master planning and facilities planning, or while extending the sewer system into previously unsewered areas.

The resulting negative impacts of CSOs and SSOs can, and have in some areas, been reduced with the design and construction of traditional deep tunnel systems for the conveyance and storage of sewage overflows. These systems are costly to design, construct, and maintain and provide limited tangible economic benefit to the municipality over the long term. For example, the Deep Tunnel project (the Tunnel and Reservoir Plan (abbreviated TARP)) in Chicago was commissioned in the mid-1970s to reduce flooding in the metropolitan Chicago area, and to reduce the harmful effects of flushing raw sewage into Lake Michigan by diverting storm water and sewage (CSOs) into temporary holding reservoirs. The Deep Tunnel system is designed to be a network of 109.4 miles of tunnels of varying size. Completion of the system is not anticipated until 2029, but substantial portions of the system have opened and are operational. Over the 30 years of construction, more than $3 billion has been spent on the project.

Sewage tunnels such as those in Deep Tunnel are normally constructed very deep (100 ft. or deeper) below the normal terrain, below the points of sewage overflow. The depth of the tunnel is dependent on local geologic conditions. Deep and expensive "drop shafts" are constructed along the tunnel route so that the sewage overflows can be routed into the tunnel. Often "consolidation sewers" are constructed at the surface to consolidate the number of overflows and direct them to the drop shafts. Expensive and proprietary tunnel boring machines (TBMs) are employed to bore the tunnels. A tunnel boring machine (TBM) also known as a "mole", is a machine used to excavate tunnels with a circular cross section through a variety of soil and rock strata. Tunnel boring machines are used as an alternative to drilling and blasting (D&B) methods in rock and conventional "hand mining" in soil. TBMs have the advantages of limiting the disturbance to the surrounding ground and producing a smooth tunnel wall which significantly reduces the cost of lining the tunnel, and makes them suitable to use in heavily urbanized areas. The major disadvantage is the upfront cost. TBMs are expensive to construct, and can be difficult to transport. Tunnel spoils (excess rock and soil material) must then be brought to the surface and hauled to disposal sites at great cost. Depending on the local geologic conditions, once bored, the tunnels are often lined with concrete to create a watertight conduit.

Due to their depth, tunnels typically require high pressure (head) pumping stations to lift tunnel contents to the POTW. High head pumping stations typically have very high energy consumption and contribute to greenhouse gas emissions.

Some U.S. cities have undertaken sewer separation projects—building a second piping system for all or part of the community. In many of these projects, cities have been able to separate only portions of their combined systems. High costs or physical limitations may preclude building a completely separate system. In 2011 Washington, D.C. separated its sewers in four small neighborhoods at a cost of $11 million.

SUMMARY OF THE INVENTION

The invention comprises a canal system designed to add waterway capacity to a sanitary sewer or combined sewer system to carry additional water flow resulting from wet weather events. As an alternative to a traditional deep tunnel and in consideration of the need to eliminate odors and floatables in such a canal system, changes in river-to-surface elevations and other obstacles, the invention comprises a two-story eco-canal with over and under chambers.

In one embodiment, the under chamber comprises a "box culvert" in conjunction with an open top channel over chamber. The over chamber may be coordinatedly disposed substantially atop the under chamber. Further, the under chamber and the over chamber can be releasably permanently attached to each other. The box culvert configuration allows for easy "cast in place" construction and can provide a lower vertical profile than a circular pipe with the same hydraulic capacity. The under chamber culvert dimensions can be readily adjusted to match the requirements of the over chamber configuration. Due to its shallow alignment and ease of connections for CSO and SSO outfalls, the under chamber application would also eliminate or minimize the need for consolidation piping. Additionally, the under chamber will minimize the pumping energy consumption, costs and greenhouse gas emissions as compared to the typical tunnel technology.

During normal operation, the under chamber is disposed beneath the open over chamber and remains substantially empty. When a sewage overflow event occurs, the under chamber fills and conveys CSO or SSOs to the appropriate location (such as a POTW or holding reservoir or other designated location), preventing these overflows from reaching the local receiving stream. The under chamber is designed with "shallow" entrance locations that allow for drive-in access for operations and maintenance, such as cleaning and repairing the under chamber rather than deep and expensive "drop shafts" that are used to access tunnels.

The under chamber may be constructed below the surface of land; below a river or other natural waterway bottom; atop the bottom of a river or waterway; or supported by pilings atop a river or waterway bottom.

In normal operation, the over chamber carries dry weather surface water and stormwater flow and is designed to complement existing river surface and surrounding land areas, thus stimulating local economic development and raising property values. The over chamber is designed to permit enhanced economic development and also to provide a degree of flood protection.

Where obstructions and obstacles exist to disposing the over chamber atop the under chamber, the over chamber can be designed to merge into a river or other local waterway while the under Chamber can be diverted to be disposed atop a waterway bottom. In one embodiment, the under chamber can be diverted to be disposed under a deck constructed above or cantilevered from shore out over the under chamber creating a riverwalk.

BRIEF DESCRIPTION OF THE DRAWINGS

The invention will be described with reference to the accompanying drawings, in which like elements are referenced with like numerals.

DETAILED DESCRIPTION OF THE INVENTION

The invention comprises a canal system designed to add waterway capacity to a sanitary sewer or combined sewer system to carry additional water flow resulting from wet weather events. Traditional canal design and construction has several limiting factors—in this initial case due to an inability to deal with odor, solids and floatables, and the fact that in all cases the canal needs to be kept at river surface elevation resulting in the need for expensive pumping systems.

As an alternative to a traditional deep tunnel and in consideration of the need to eliminate odors and floatables in such a canal system, changes in river-to-surface elevations and other obstacles, the invention comprises a two-story eco-canal with over and under Chambers to simultaneously provide:

incentives for stormwater separation from sewers;
economic benefit derived from urban renewal and enhance community development potential; and
less costly and more easily maintained wet weather overflow conveyance conduits.

The system of the invention comprises a "box culvert" type bottom (under) chamber in conjunction with an open top channel (over) chamber. The under chamber could be round, as in the case of a pipe, or square as in the case of a box culvert. The over chamber may comprise an open canal. The over chamber can be coordinatedly disposed substantially atop the under chamber. Further, the under chamber and the over chamber can be releasably permanently attached to each other.

During normal operation, the under Chamber is disposed beneath the open over chamber and remains substantially empty. When a sewage overflow event occurs, the under chamber fills and conveys CSO or SSO to the appropriate location (such as a POTW or holding reservoir or other designated location), preventing these overflows from reaching the local receiving stream. The under chamber is designed with "shallow" entrance locations that allow for drive-in access for operations and maintenance, such as cleaning and repairing the under chamber, in contrast to traditional deep tunnel designs that require deep drop shafts resulting in difficult, expensive and time consuming access.

The under chamber may be constructed below the surface of land; below a river or other natural water way bottom; atop the bottom of a river or waterway; or supported by pilings atop a river or waterway bottom. The location of the under chamber is typically dictated by the elevation drop necessary to convey the overflow to the final conveyance location, such as the elevation drop necessary to connect the under chamber at the final conveyance location.

In normal operation, the over chamber carries dry weather surface water and stormwater flow and is designed to complement existing river surface and surrounding land areas, thus stimulating local economic development and raising property values. In one embodiment, the over chamber comprises a flow-through canal on land. In one embodiment, the over chamber comprises a linear retention pond on land. In yet another embodiment, the Over chamber comprises a canal within another waterway. The over chamber is designed to permit enhanced economic development and also to provide a degree of flood protection. The over chamber can also serve as a receiving stream for additional stormwater discharges resulting from separation of the existing combined sewers. For example, a community may separately convey storm and sanitary flow to its border with a downstream combined community. At that point, these flows may be combined to be conveyed through the downstream community to the interceptor, tunnel and waste water treatment plant ("WWTP"). A receiving stream or reservoir could be located near this border to collect and convey the storm flows as "runoff only" to a storm system or outfall—eliminating the need to combine these with the already separate sanitary flows.

The over chamber may be disposed substantially directly over the under chamber, thus creating a canal where land to river surface elevations will allow and where no obstructions such as railroads and road surfaces exist. Alternately, where land-to-surface elevations prohibit a flowing canal, the over chamber can be constructed as a linear retention pond with a discharge weir to control flow back to a nearby waterway.

Where such obstructions and obstacles exist, the over chamber can be designed to merge into a river or other local waterway while the under Chamber can be diverted to be disposed atop a waterway bottom. In one embodiment, the under chamber can be diverted to be disposed under a deck cantilevered out over the under chamber creating a riverwalk.

In one embodiment, the design of the over chamber and the under chamber allows for easy cleaning and flushing of the under chamber using the water in the over chamber. This can be accomplished by opening gates to allow water from the over chamber to flow into the under chamber at any interval determined for cleaning and odor control.

The design and construction of a portion of a deep tunnel may still be necessary in some cases to manage final conveyance of flow to a POTW. In the case where tunnel spoils will exist (i.e., earth removed for the construction of the final tunnel portion of the conveyance systems), such spoils can be transported and disposed in areas that are conducive for the construction of island recreation areas and for the creation of additional riverwalk area.

With the build out of the over chamber and under chamber design, riverfront property can become an asset to a municipality rather than a liability, and regardless of the design option chosen, substantial development should be expected to occur along many portions. Additional hiking and biking, canoeing, waterskiing, and boating, leisurely walks and picnics should become even more prevalent along the waterway.

Figure 1A:
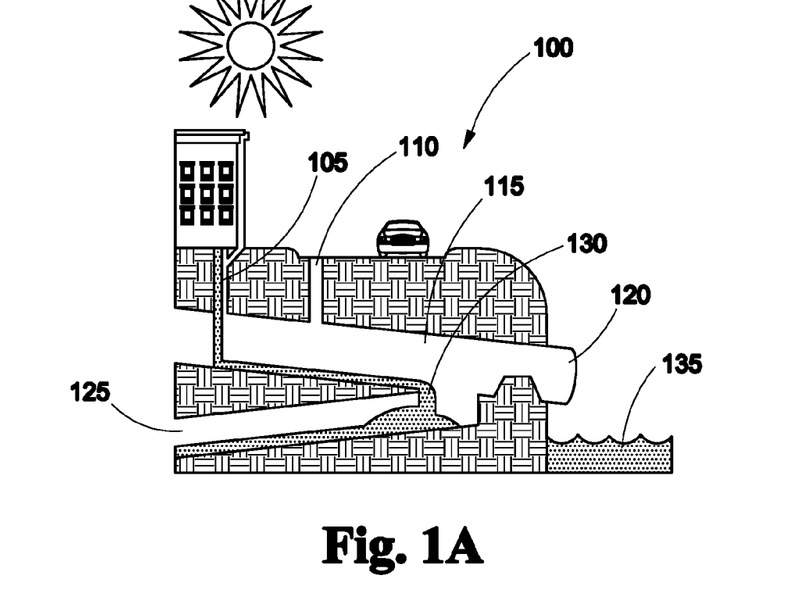
FIG. 1A depicts a schematic of a combined sewer system in normal operation.

Turning to the figures, FIG. 1A depicts a schematic of a combined sewer system 100 in normal operation. Combined sewer system 100 comprises entrances into the system 105, 110, 115; an outlet 120 to surface water 135; and a sewer line 125 to direct flow to publicly-owned treatment works. During normal operations, the capacity of combined sewer system 100 is sufficient such that all or virtually all wastewater 130 flows through sewer line 125 to the publicly-owned treatment works.

Figure 1B:
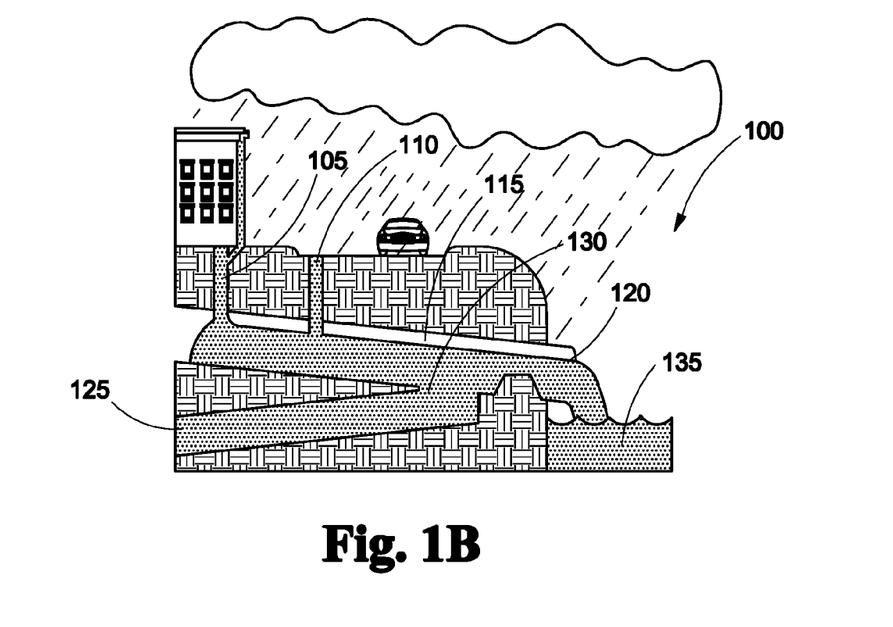
FIG. 1B depicts a schematic of a combined sewer system during operation in an overflow event.

FIG. 1B depicts a schematic of the combined sewer system 100 during operation in an overflow event. Combined sewer system 100 comprises entrances into the system 105, 110, 115; an outlet 120 to a surface water; and a sewer line 125 to direct flow to publicly-owned treatment works. In an overflow event, sewer line 125 reaches capacity causing overflow of wastewater 130 through outlet 120 into surface water 135.

Figure 2:
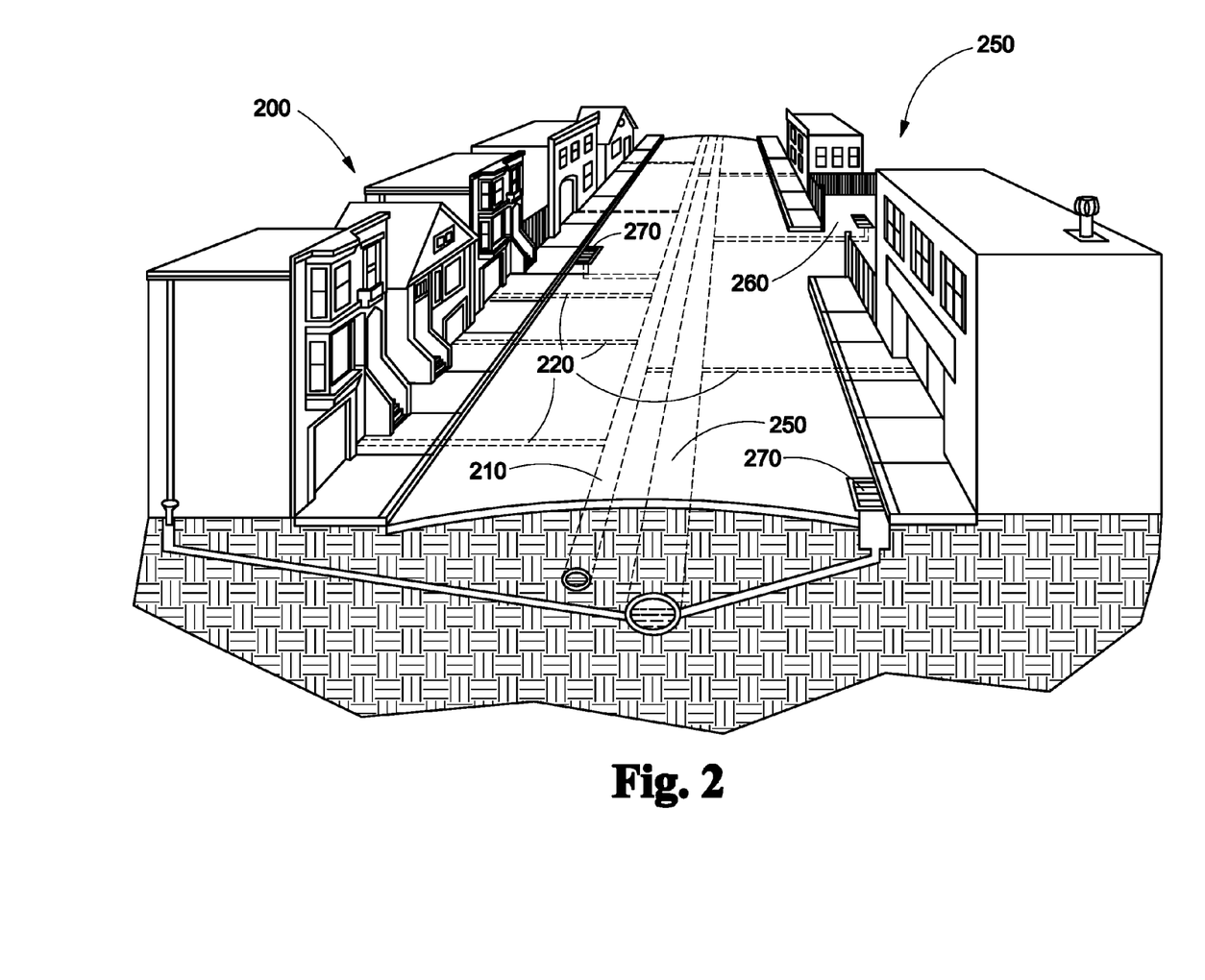
FIG. 2 depicts a schematic of a sanitary sewer system in combination with a separate stormwater drain (storm sewer) system.

FIG. 2 depicts a schematic of a sanitary sewer system 200 in combination with a separate stormwater drain (storm sewer) system 250. Sanitary sewer system 200 comprises a sanitary sewer pipe 210 and stormwater drain system 250 comprises a storm sewer pipe 260. Sewage feeds into sanitary sewer pipe 210 through a variety of sewage lines 220. Storm water feeds into storm sewer pipe 260 through a variety of inlets such as drains 270.

Figure 3:
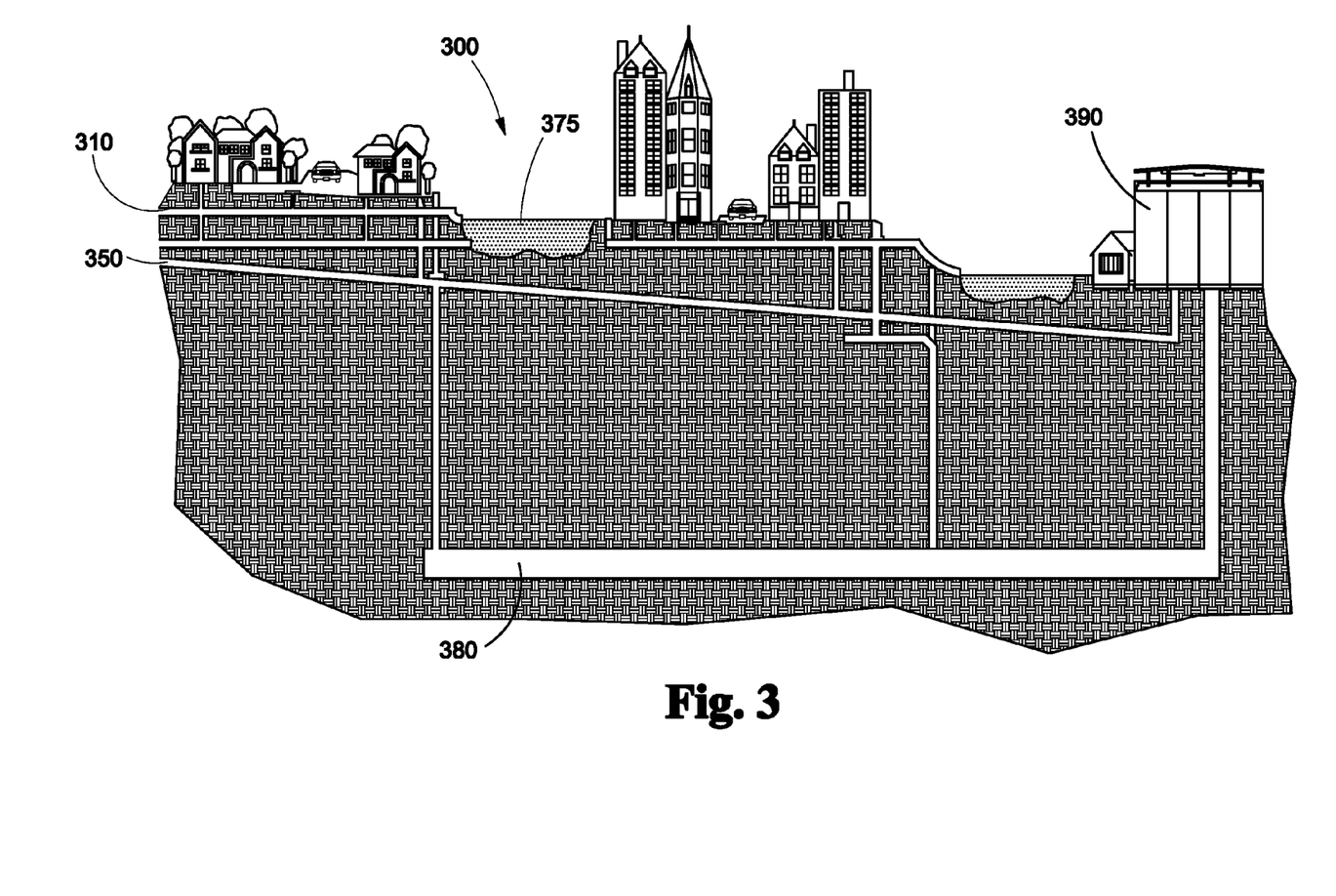
FIG. 3 depicts a schematic of a sanitary sewer system including a deep tunnel system for accommodating sewer overflows.

FIG. 3 depicts a schematic of a combined sanitary sewer system 300 including a deep tunnel system for accommodating sewer overflows. Under normal conditions, sanitary sewer pipe 310 and storm sewer pipe 350 drain to public-owned treatment works 390. In cases of extreme wet weather, sanitary sewer pipe 310 and storm sewer pipe 350 may overflow into outfall 375. Outfall 375 drains to public-owned treatment works 390 but if drainage is not possible, it drains into deep tunnel 380 and is retained until it can be pumped into public-owned treatment works 390.

Figure 4:
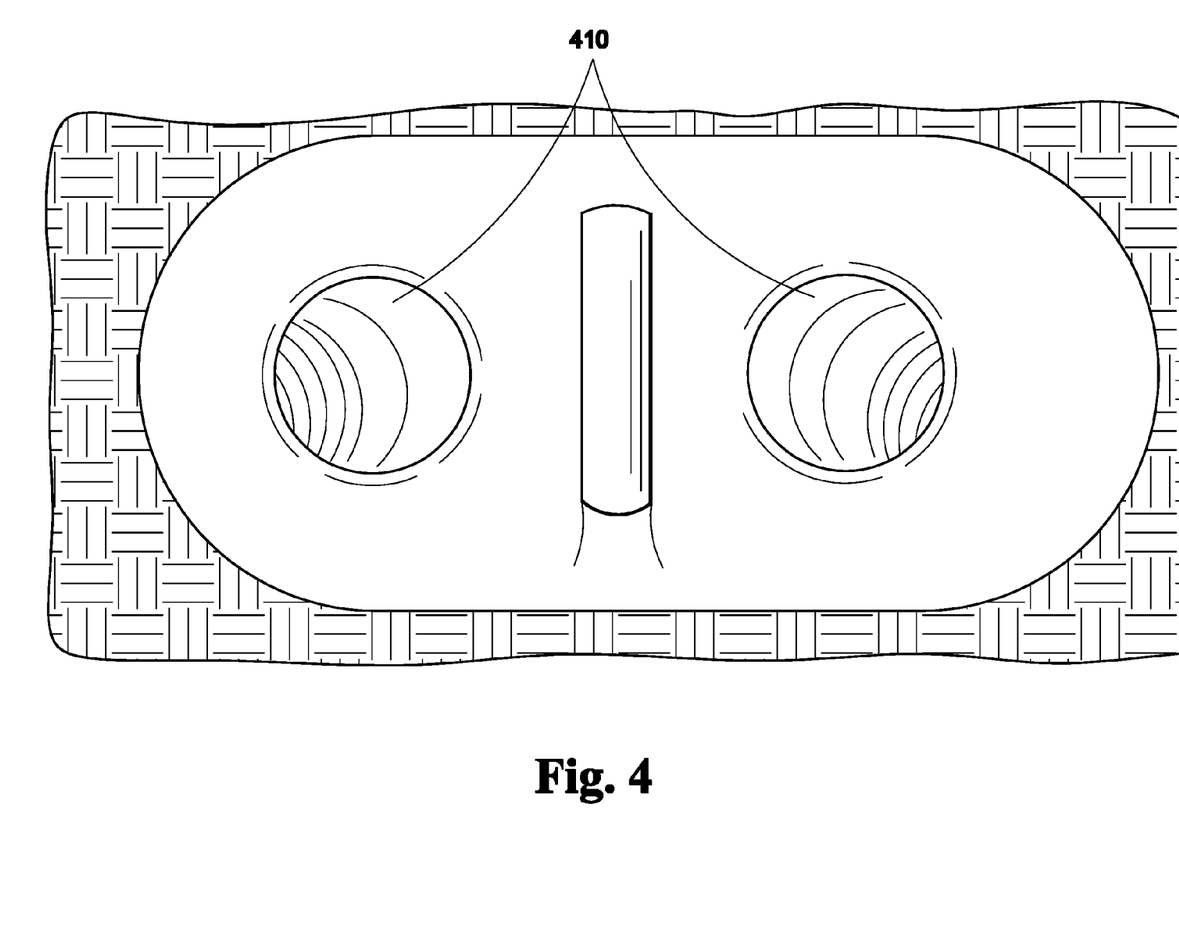
FIG. 4 depicts a photograph taken within a deep tunnel.

FIG. 4 depicts a deep tunnel 410 such as deep tunnel 380 of FIG. 3.

Figure 5:
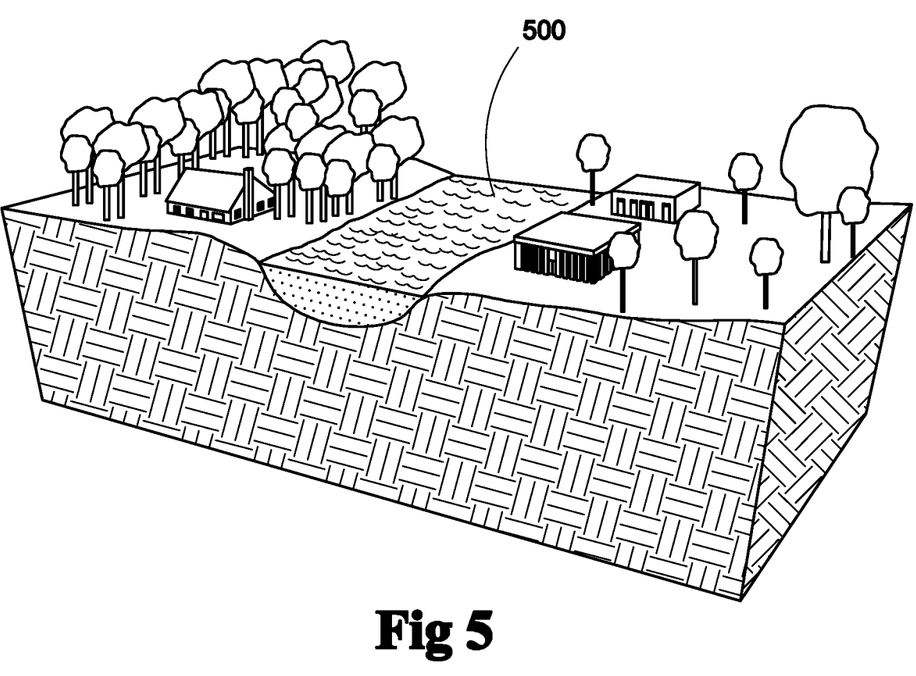
FIG. 5 depicts one embodiment of the invention comprising an "over chamber" canal for stormwater separation.

FIG. 5 depicts one embodiment of the invention comprising an "over chamber" canal 500 for stormwater separation.

Figure 6A:
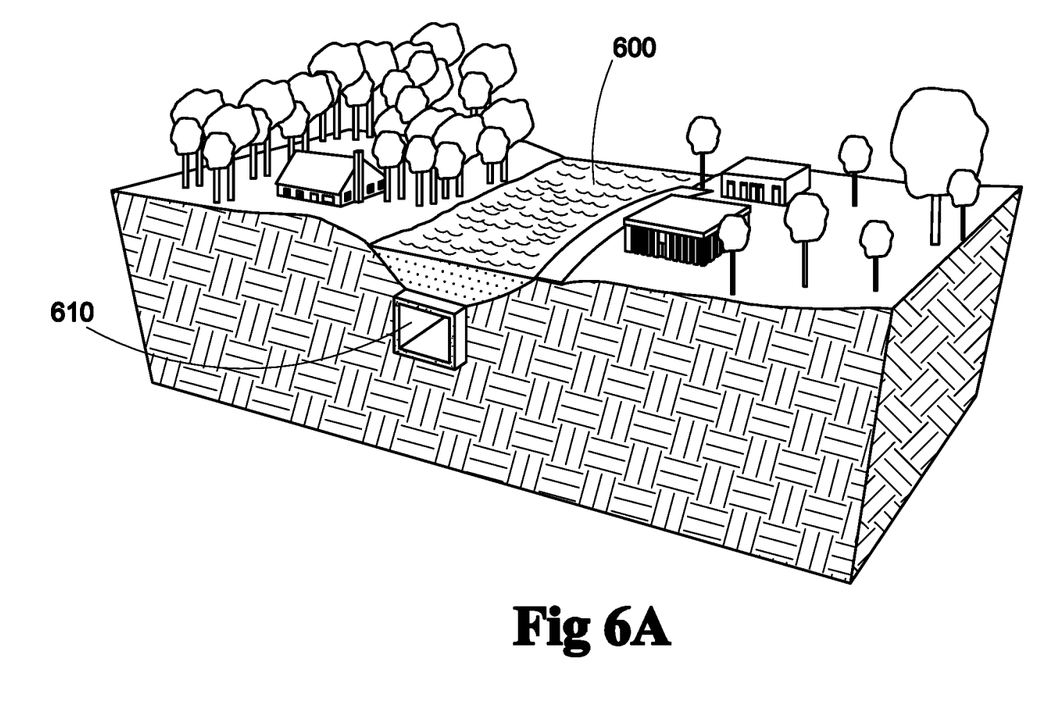
FIG. 6A depicts one embodiment of the invention comprising an "over chamber" canal for stormwater separation in combination with an under chamber in the form of a box culvert for sanitary sewer overflow conveyance.

FIG. 6A depicts one embodiment of the invention comprising an "over chamber" canal 600 for stormwater separation in combination with an under chamber 610 in the form of a box culvert for sanitary sewer overflow conveyance.

Figure 6B:
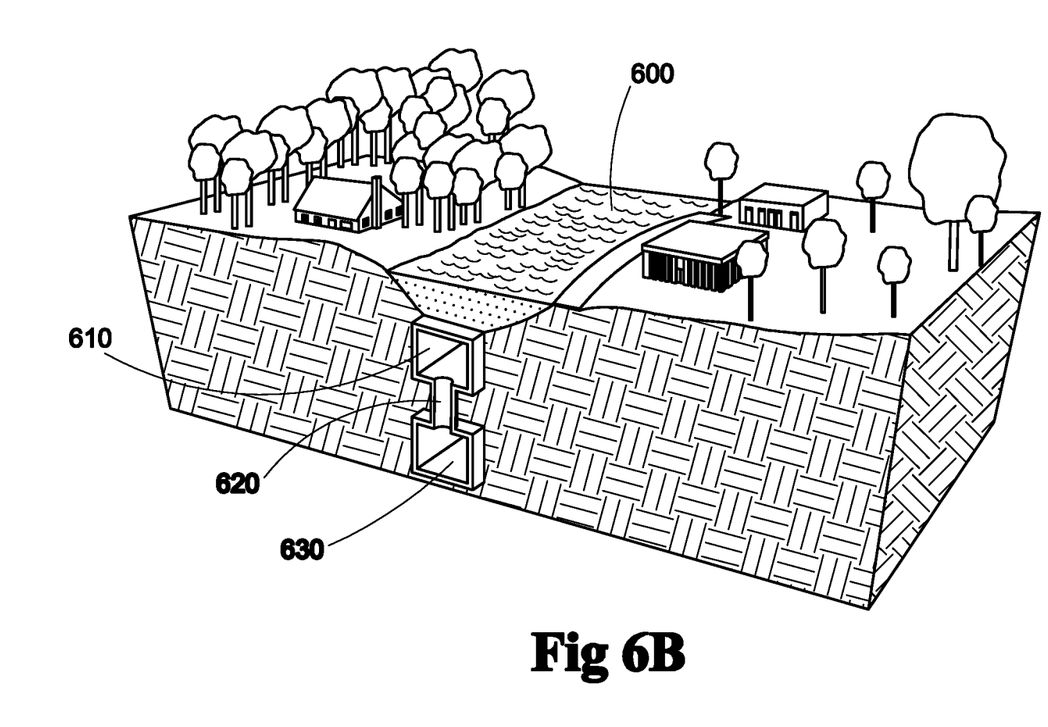
FIG. 6B depicts one embodiment of the invention comprising an "over chamber" canal for stormwater separation in combination with an under chamber in the form of a box culvert for sanitary sewer overflow conveyance with a pipe leading to a holding reservoir for combined sewer or sanitary sewer overflow.

FIG. 6B depicts one embodiment of the invention comprising an "over chamber" canal 600 for stormwater separation in combination with an under chamber 610 in the form of a box culvert for sanitary sewer overflow conveyance. The embodiment of FIG. 6B further depicts pipe 620 leading from under chamber 610 to holding reservoir 630 such that combined sewer overflow or sanitary sewer overflow can be conveyed from under chamber 610 to holding reservoir.

Figure 7:
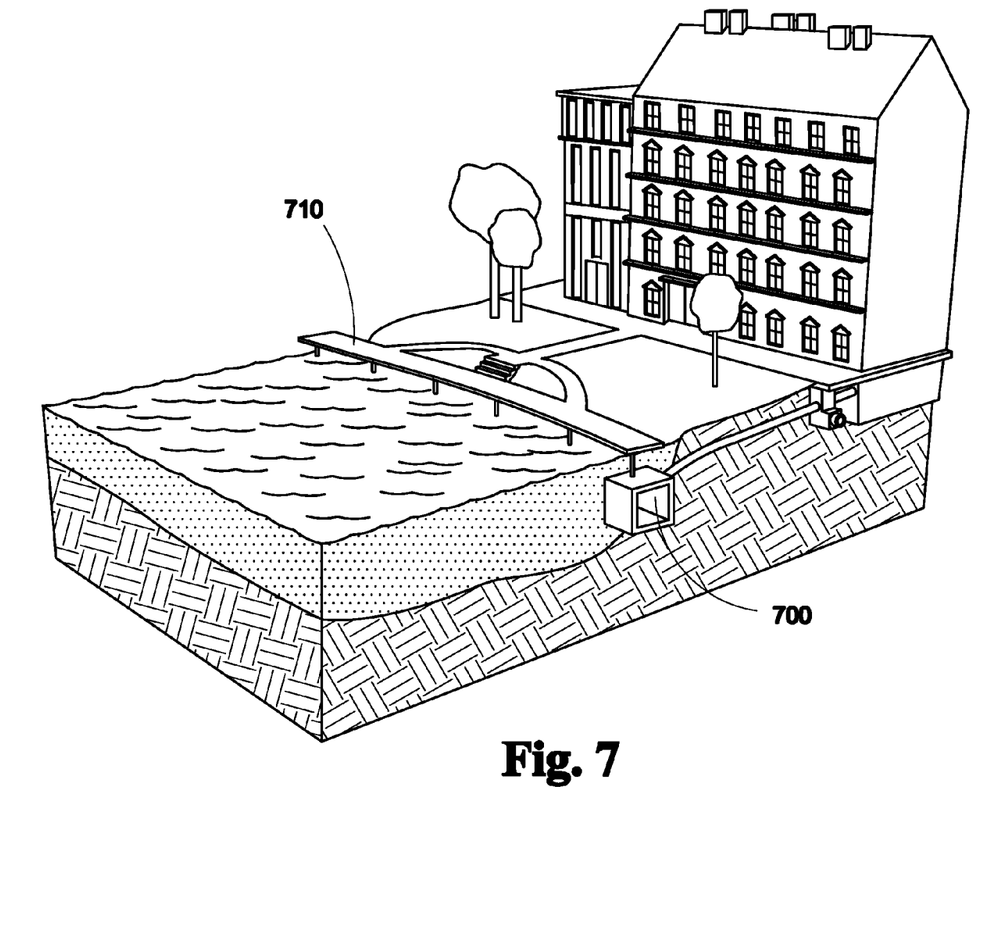
FIG. 7 depicts one embodiment of the invention comprising an under chamber in the form of a box culvert situated below a riverwalk.

FIG. 7 depicts one embodiment of the invention comprising an under chamber in the form of a box culvert 700 situated below a riverwalk 710. Tunnel spoils created during construction of under chamber 700 can be used to build riverwalk 710.

Figure 8:
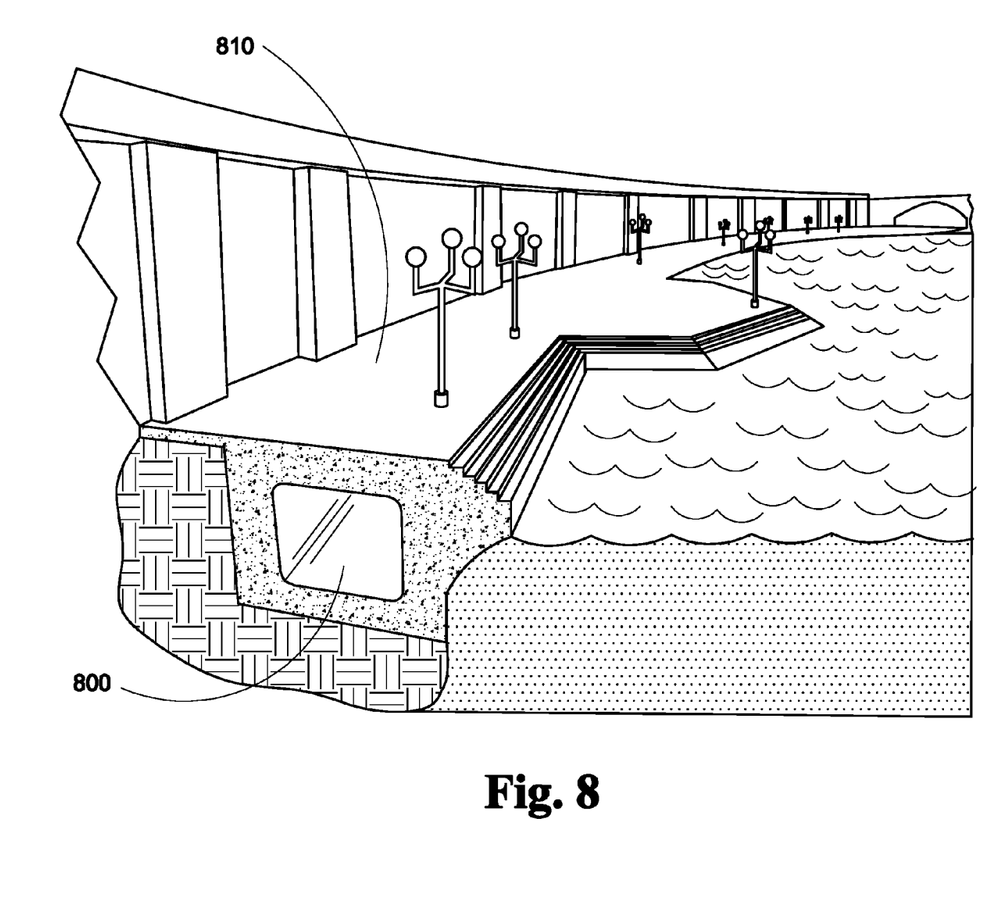
FIG. 8 depicts one embodiment of the invention comprising an under chamber in the form of a box culvert embedded within a riverwalk.

FIG. 8 depicts one embodiment of the invention comprising an under chamber in the form of a box culvert 800 embedded within a riverwalk 810. Tunnel spoils created during construction of under chamber 800 can be used to build riverwalk 810.

Figure 9:
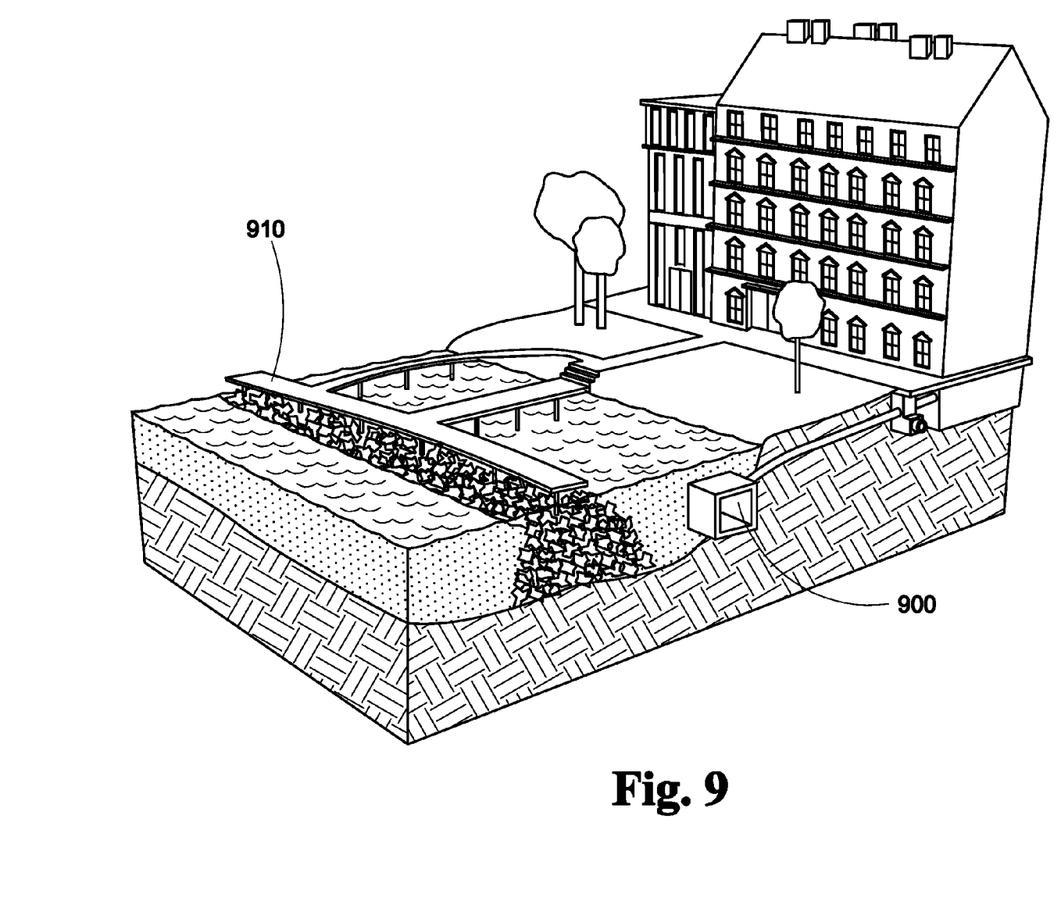
FIG. 9 depicts one embodiment of the invention comprising an under chamber in the form of a box culvert situated below an over the riverwalk.

FIG. 9 depicts one embodiment of the invention comprising an under chamber 900 in the form of a box culvert situated below an over-the-river riverwalk 910. Tunnel spoils created during construction of under chamber 900 can be used to build over-the-river riverwalk 910.

Figure 10A:
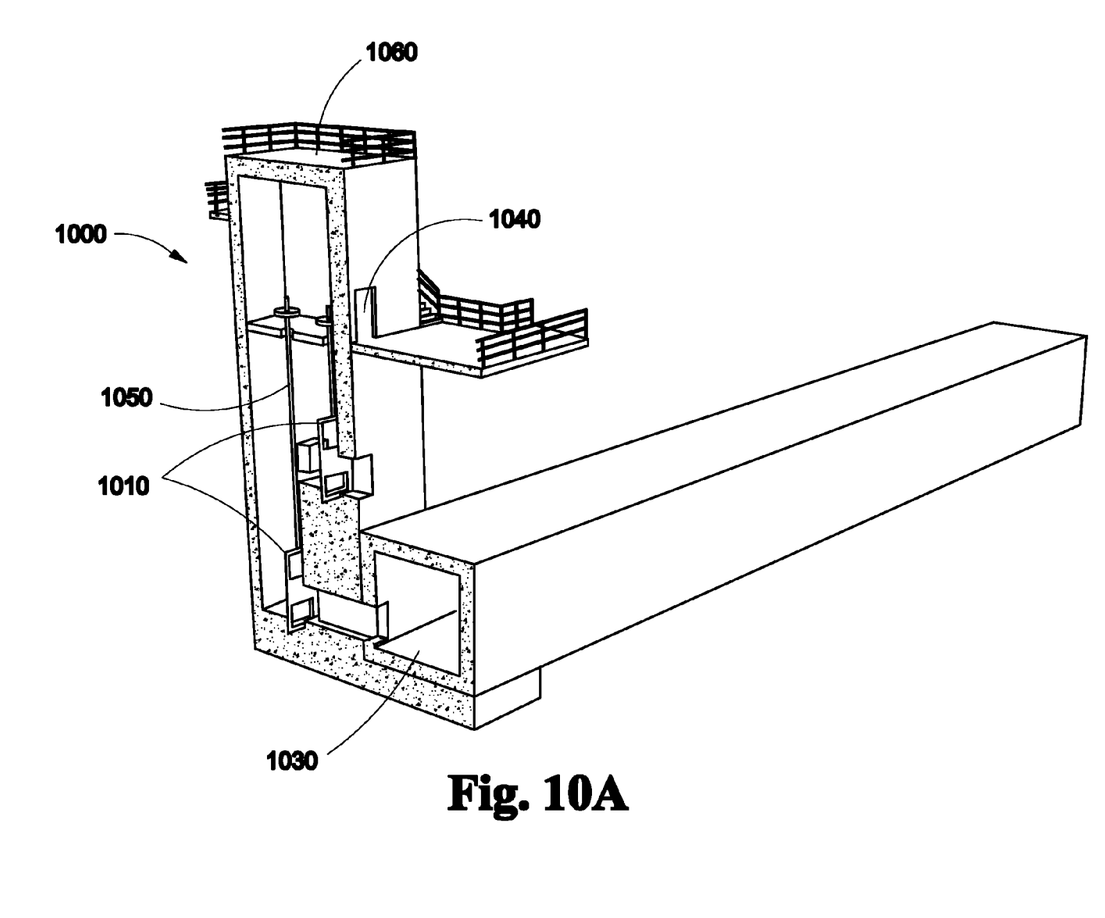
FIG. 10A depicts one embodiment of the invention comprising a gate tower having a flushing gate.

FIG. 10A depicts one embodiment of the invention comprising a gate tower 1000 having a flushing gate 1010 that can be opened to allow river water to enter an under chamber 1030 in the form of a box culvert and flush it downstream. An access door 1040 allows operators to enter the interior 1050 of gate tower 1000 and open the flushing gate 1010. A viewing stand 1060 can be built on the top of the gate tower 1000 that is accessible to pedestrians from a riverwalk, for instance via a circular staircase. A plurality of such gate towers 1000 can be located along the length of under chamber 1030.

Figure 10B:
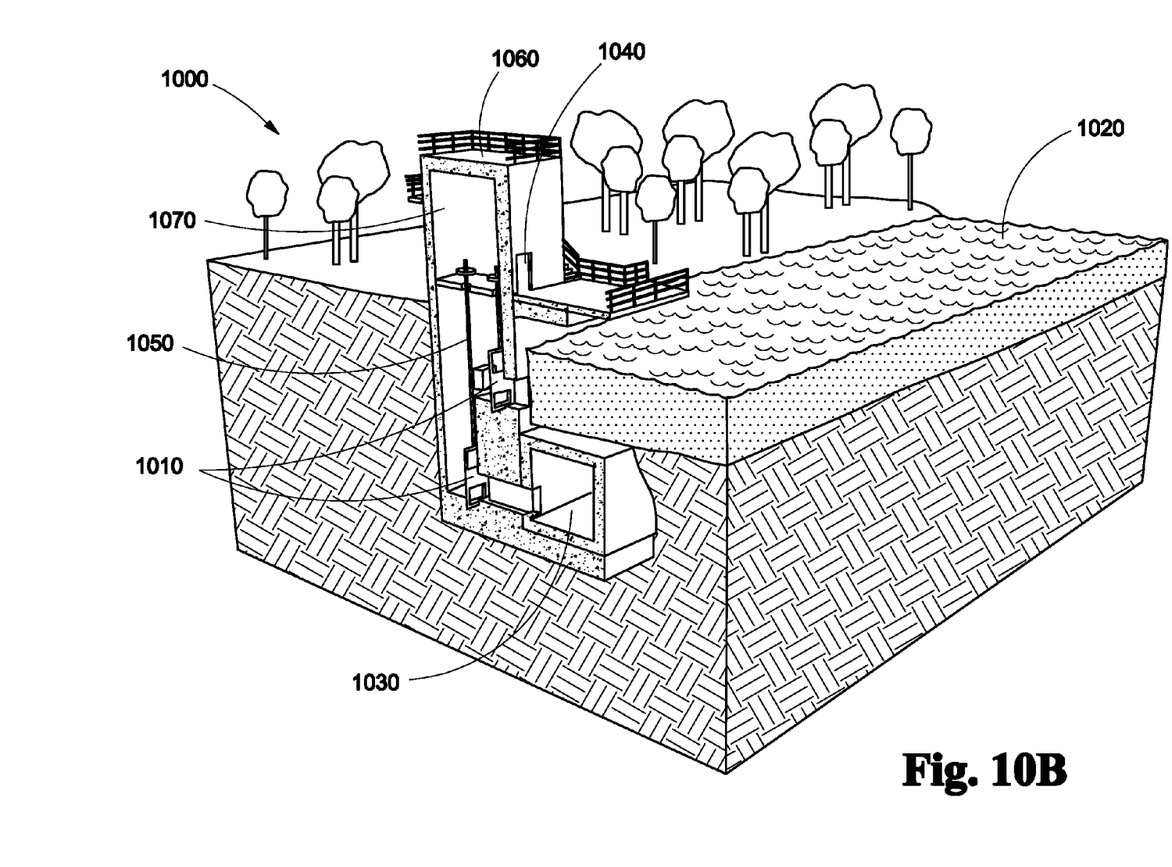
FIG. 10B depicts an exterior perspective view of the embodiment seen in FIG. 10A as constructed.

FIG. 10B depicts an exterior perspective view of the embodiment seen in FIGS. 10A and 10B.

Figure 10C:
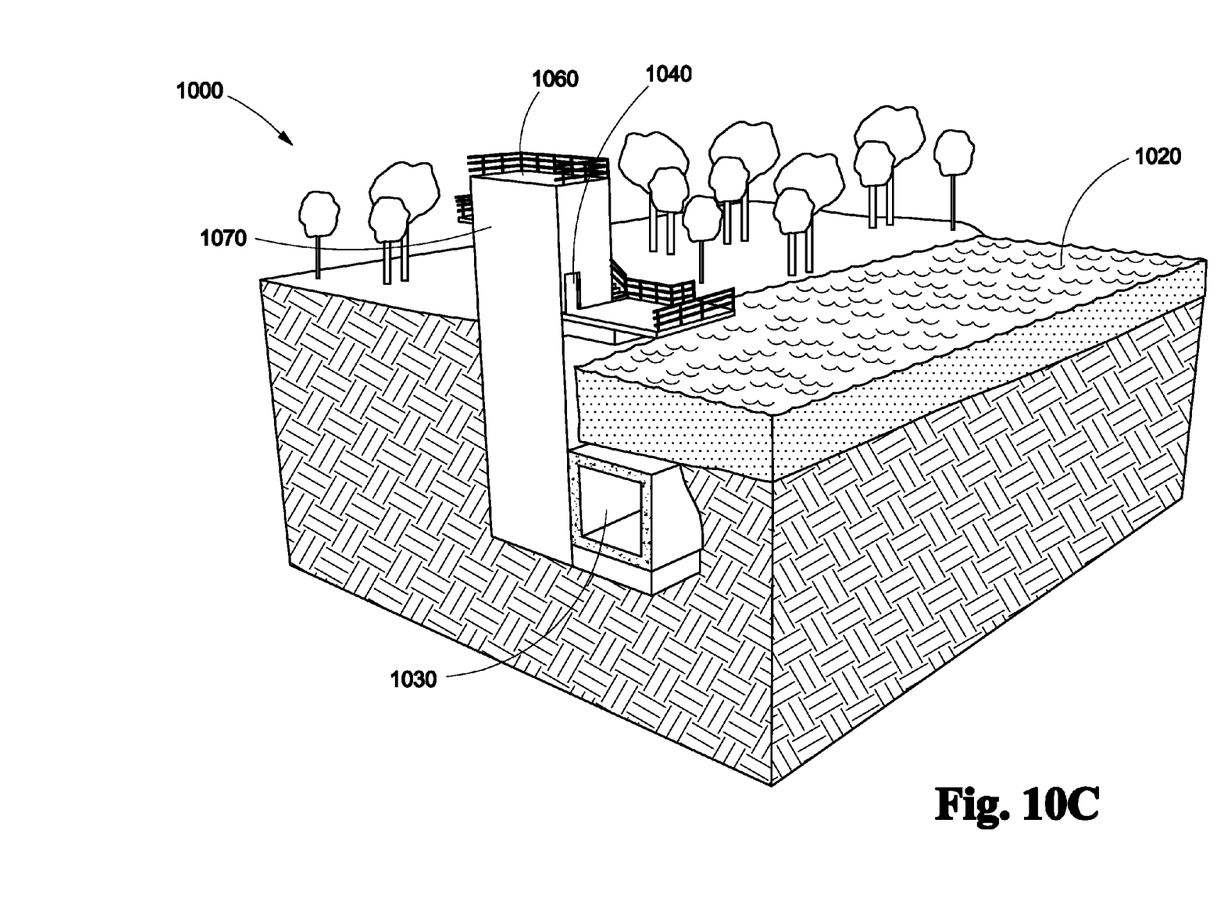
FIG. 10C depicts a cutaway view of the exterior perspective view as seen in FIG. 10B.

FIG. 10C depicts a cutaway exterior perspective view of the embodiment seen in FIG. 10A and showing river water 1020 and circular staircase 1070.

Figure 11:
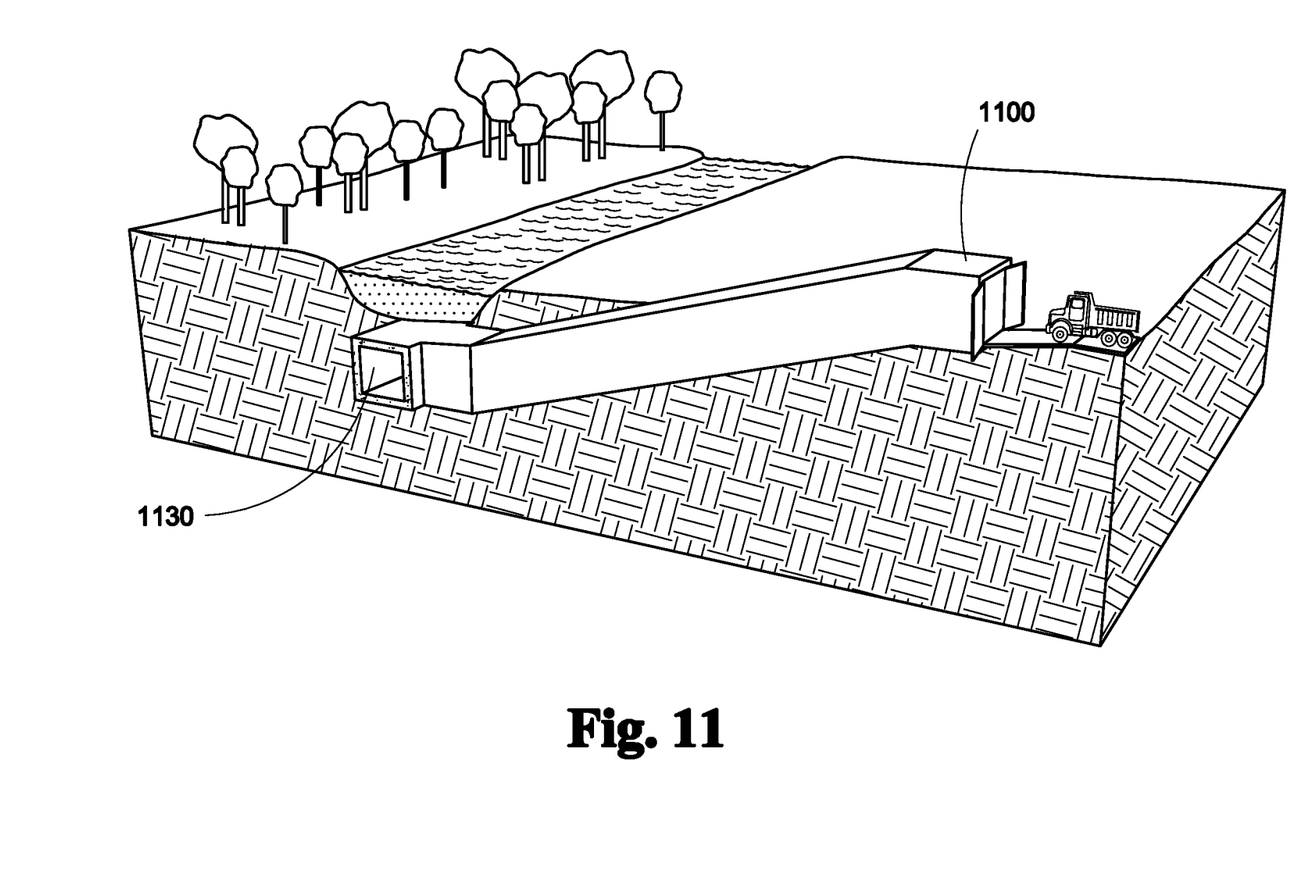
FIG. 11 depicts a "shallow" entrance location that allows for drive-in access for operations and maintenance, such as cleaning and repairing the under chamber.

FIG. 11 depicts a "shallow" entrance location 1100 that allows for drive-in access for operations and maintenance, such as cleaning and repair of under chamber 1130.

In the foregoing description, the invention has been described with reference to specific exemplary embodiments thereof. It will be apparent to those skilled in the art that a person understanding this invention may conceive of changes or other embodiments or variations, which utilize the principles of this invention without departing from the broader spirit and scope of the invention. The specification and drawings are, therefore, to be regarded in an illustrative rather than a restrictive sense.

What is claimed is:

1. A two-story sewer system comprising:
   a lower chamber; and
   an upper chamber,
   wherein the upper chamber is coordinatedly disposed substantially over the lower chamber,
   wherein further the lower chamber and the upper chamber are releasably attached to each other,
   wherein the lower chamber comprises a box culvert,
   wherein the upper chamber comprises an open canal,
   wherein the lower chamber conveys combined sewer overflow or sanitary sewer overflow to a holding reservoir.

2. The system of claim 1, wherein the upper chamber conveys dry weather surface water and stormwater flow.

3. The system of claim 2, wherein the dry weather surface water and stormwater flow is carried to a holding reservoir.

4. The system of claim 3, wherein the dry weather surface water and stormwater flow is carried from the holding reservoir to a local waterway.

5. The system of claim 2, wherein the dry weather surface water and stormwater flow is carried to a local waterway.

6. The system of claim 1, further comprising gates between the upper chamber and the lower chamber configured to allow water in the upper chamber to flow into the lower chamber.

7. The system of claim 1, further comprising a tunnel for conveyance of water flow to a public owned treatment works.

8. The system of claim 7, where earth removed for construction of the tunnel is used to construct island recreation areas and riverwalk areas.

9. A two-story sewer system comprising:
   a lower chamber; and
   an upper chamber,
   wherein the upper chamber is coordinatedly disposed substantially over the lower chamber,
   wherein further the lower chamber and the upper chamber are releasably attached to each other,
   wherein the lower chamber comprises a box culvert,
   wherein the upper chamber comprises an open canal,
   wherein the combined sewer overflow or sanitary sewer overflow is conveyed from the holding reservoir to the publicly owned treatment works facility.

\* \* \* \* \*